United States Patent
Gao et al.

(10) Patent No.: US 12,253,418 B2
(45) Date of Patent: Mar. 18, 2025

(54) METHOD FOR IN-SITU MEASUREMENT OF TEMPERATURE AT MICROWAVE-INDUCED MICROSCOPIC HOT SPOTS, TEMPERATURE MEASURING PARTICLES AND THE DEVICE USED

(71) Applicant: Tianjin University, Tianjin (CN)

(72) Inventors: Xin Gao, Tianjin (CN); Zhenyu Zhao, Tianjin (CN); Hong Li, Tianjin (CN)

(73) Assignee: Tianjin University, Tianjin (CN)

( * ) Notice: Subject to any disclaimer, the term of this patent is extended or adjusted under 35 U.S.C. 154(b) by 454 days.

(21) Appl. No.: 17/874,201

(22) Filed: Jul. 26, 2022

(65) Prior Publication Data

US 2023/0125349 A1    Apr. 27, 2023

Related U.S. Application Data

(63) Continuation of application No. PCT/CN2022/098046, filed on Jun. 10, 2022.

(51) Int. Cl.
  *G01K 11/20*  (2006.01)
  *G01K 11/32*  (2021.01)

(52) U.S. Cl.
  CPC .............. *G01K 11/20* (2013.01); *G01K 11/32* (2013.01)

(58) Field of Classification Search
  CPC .................................. G01K 11/20; G01K 11/32
  See application file for complete search history.

(56) References Cited

U.S. PATENT DOCUMENTS 3,430,041 A * 2/1969 Kaye ...................... G01N 21/33
356/51

FOREIGN PATENT DOCUMENTS

| CN | 101840840 A | * | 9/2010 | ............ H01J 61/025 |
| CN | 105891235 A | | 8/2016 | |
| CN | 107155256 A | * | 9/2017 | ........ H01J 37/32229 |
| CN | 209612932 U | | 11/2019 | |
| CN | 111426672 A | | 7/2020 | |
| CN | 111896895 A | * | 11/2020 | |

* cited by examiner

*Primary Examiner* — Patrick Assouad
*Assistant Examiner* — Julia Fitzpatrick (57) ABSTRACT

A method for in situ measurement of temperature at microwave-induced microscopic hot spots, temperature measuring particles and the device used are provided. For the temperature measurement demand of the microscopic hot spot of microwave field, loading fluorescent temperature measuring particles on the surface of solid particles, and the actual temperature of particles in micro scale can be measured by using its temperature sensitive fluorescence characteristics. The present disclosure builds a microwave field in-situ fluorescence test device to disperse the test particles loaded with fluorescent temperature measuring materials in the liquid solvent and place in the quartz sample tank in the microwave cavity, which can measure the actual temperature of the particles to be measured under microwave radiation. The present disclosure breaks through the difficult problem of measuring micro scale temperature in microwave field and can realize the quantitative measurement of microwave-induced overheating temperature in micro scale.

6 Claims, 7 Drawing Sheets

METHOD FOR IN-SITU MEASUREMENT OF TEMPERATURE AT MICROWAVE-INDUCED MICROSCOPIC HOT SPOTS, TEMPERATURE MEASURING PARTICLES AND THE DEVICE USED

CROSS-REFERENCE TO RELATED APPLICATIONS

This application is a continuation of International Patent Application No. PCT/CN2022/098046 with a filing date of Jun. 10, 2022, designating the United States, and further claims priority to Chinese Patent Application No. 202111253478.1 with a filing date of Oct. 27, 2021, Chinese Patent Application No. 202111253481.3 with a filing date of Oct. 27, 2021. The content of the aforementioned applications, including any intervening amendments thereto, are incorporated herein by reference.

TECHNICAL FIELD

The present disclosure relates to the field of microwave chemistry technology, in particular to a method for in-situ measurement of temperature at microwave-induced microscopic hot spots, temperature measuring particles and the device used.

BACKGROUND

Microwave has the advantages of improving the quality of materials synthesis, accelerating the catalytic reaction rate and strengthening the separation efficiency, so it is widely used in the field of chemical industry. The excellent characteristics of microwave heating are largely due to its selective heating of high dielectric loss materials, that is, the rate of microwave absorption and heating of micro and nano particles is much faster than that of surrounding solvents, so that local hot spots will be formed at the micro scale. The local high temperature of the microwave absorbing agent can make the reactant or precursor react quickly on its surface, but do not participate in the reaction in the solvent body, so as to improve the rate and selectivity of chemical reaction and prepare materials with special morphology. However, due to the interaction between microwave and metal, the application of high-precision temperature measurement device in microwave field is limited, so the micro hot spots in microwave field have not been measured accurately. The realization of the in-situ measurement of temperature at microscopic hot spots in microwave field is of great significance to reveal the mechanism of microwave enhanced chemical reaction and separation process and guide microwave-assisted material synthesis.

At present, nano sensing technology based on fluorescent materials is applied to cells and microfluidics to realize in-situ measurement of temperature or other properties. As fluorescent nano thermometers, there are a variety of substances, such as organic compounds, nanoparticles, metal organic frameworks and so on.

Through the search, no patent present disclosure documents related to the patent application of the present disclosure have been found.

SUMMARY

The present disclosure aims to overcome the deficiencies in the prior art and provide a material, application and method for measuring microscopic hot spots in microwave field.

The technical solution adopted by the present disclosure to solve its technical problems is:

An in-situ measuring device for temperature at microscopic hot spot induced by microwave, including a microwave generator and a supporting rectangular waveguide, a transition waveguide, a cylindrical microwave interception structure, an optical fiber thermometer, a single-mode microwave cavity, an ultraviolet lamp, a fluorescence spectrometer, a quartz sample tank and an adjustable short-circuit piston; the single-mode microwave cavity is arranged along a horizontal direction, and the single-mode microwave cavity is hollow with openings at both ends, one horizontal end of the single-mode microwave cavity is closely communicated with the microwave generator and the supporting rectangular waveguide through the transition waveguide, and the other horizontal end of the single-mode microwave cavity is connected with the adjustable short-circuit piston through the transition waveguide, wherein the adjustable short-circuit piston is capable of adjusting the stagnation point position in the microwave cavity.

A top side and a longitudinal side of the single-mode microwave cavity are provided with openings, an opening on the top side of the single-mode microwave cavity is connected with the ultraviolet lamp, the cylindrical microwave interception structure is closely arranged between the opening on the top side of the single-mode microwave cavity and the ultraviolet lamp, and the fluorescence spectrometer is connected with an opening on the longitudinal side of the single-mode microwave cavity, and the cylindrical microwave interception structure is closely arranged between the opening on the longitudinal side of the single-mode microwave cavity and the fluorescence spectrometer.

The quartz sample tank is arranged at a center of the single-mode microwave cavity, a side of the quartz sample tank is arranged facing a microwave front opening of the microwave generator, and the quartz sample tank is configured to hold liquid materials.

The optical fiber thermometer is configured to be inserted into the quartz sample tank and monitor a sample body temperature in a liquid sample in the quartz sample tank in real time.

Further, an output microwave frequency of the microwave generator is 2.45 GHz, the microwave generator is capable of adjusting an output power, and a power range is 0-600 W;

Or, the transition waveguide is a trumpet shape.

Or, the cylindrical microwave interception structure is made of stainless steel, with a diameter of 20-70 mm and a length of 100-200 mm.

Further, an adjustment range of the adjustable short-circuit piston is 0-100 mm and an adjustment accuracy is 0.1 mm; or, the ultraviolet lamp is a UVB ultraviolet lamp with a rated power of 0-50 W and a light source wavelength of 265 nm.

Further, the fluorescence spectrometer is an optical fiber spectrometer, and a test wavelength range is 300-1000 nm.

Or, the quartz sample tank is a square quartz sample tank with a size of (40-100) mm*(30-80) mm*(5-20) mm.

Further, the fluorescence temperature measuring particles include europium ion, terbium ion and biphenyl-3,3',5,5'-tetracarboxylic acid, and a molar ratio of europium ion, terbium ion and biphenyl-3,3',5,5'-tetracarboxylic acid is 3-5:0.5-2:3-8.

A method for preparing fluorescent-loaded particles to be temperature measured, wherein the method includes the following steps: loading fluorescent temperature measuring particles on the particles waited for temperature measuring, and the fluorescent temperature measuring particles include europium ion, terbium ion and biphenyl-3,3',5,5'-tetracarboxylic acid, and a molar ratio of europium ion, terbium ion and biphenyl-3,3',5,5'-tetracarboxylic acid is 3-5:0.5-2:3-8.

The method for preparing the particle to be temperature measured is shown as below:

Step 1: dissolving ferric chloride pentahydrate and terephthalic acid in N, N-dimethylformamide, stirring under ultrasound until all solids are dissolved to obtain a solution, and then transferring the solution to a reactor for hydrothermal reaction, and a reaction temperature is 80-120° C. and a reaction time is 6-48 hours, so as to obtain a ferrous-based metal organic frame material.

Wherein a molar ratio of ferric chloride pentahydrate:terephthalic acid:N, N-dimethylformamide is 0.5-3:0.2-2:1-30.

Step 2: putting particles of the ferrous-based metal organic frame material in a tubular furnace and roasting the material in an air environment; wherein a roasting time is 10-60 minutes and a roasting temperature is 250-450° C.; then, further roasting the material in a nitrogen environment, wherein a roasting time is 5-30 minutes and a roasting temperature is 500-900° C.; obtaining nano solid particles with high dielectric loss after roasting.

Step 3: uniformly dispersing the carbon nanoparticles in N, N-dimethylformamide solution to obtain a mixed liquid of carbon particle-N, N-dimethylformamide, wherein a mass concentration of N, N-dimethylformamide solution is greater than 99%.

Step 4: adding biphenyl-3,3',5,5'-tetracarboxylic acid into the mixed liquid of carbon particle-n, N-dimethylformamide obtained in step 3, wherein a mass ratio of carbon particles:biphenyl-3,3',5,5'-tetracarboxylic acid:N, N-dimethylformamide is 2-30:0.1-10:10-100.

Step 5: adding a mixed solution of europium nitrate hexahydrate and terbium nitrate hexahydrate into the liquid obtained in step 4, and a molar ratio of europium ion and terbium ion is 3-5:0.5-2.

Step 6: stirring the mixed solution in step 5 and carrying out hydrothermal reaction in an oil bath pot, wherein a reaction temperature is 80-120° C. and a reaction time is 6-48 hours; centrifuging the reaction solution at 5000-10000 rpm after the reaction to obtain carbon particles loaded with europium terbium mixed metal organic framework materials, that is, the fluorescent-loaded particles to be temperature measured.

The materials for measuring microscopic hot spots in microwave fields are irradiated under the ultraviolet light at 265 nm to obtain the particles, and the particles obtained have characteristic fluorescence emission peaks at 600-650 nm and 520-570 nm, respectively, which change color from green to red as the temperature increases.

An application of the prepared fluorescent loaded particles to be temperature measured in the measurement of microscopic hot spots in the microwave field, a height ratio of the characteristic peaks at 600-650 nm and 520-570 nm has a linear relationship with the temperature when the particles to be temperature measured in the range of 20-100° C. According to the fluorescence spectrum under the ultraviolet light captured by the optical fiber spectrometer, the real temperature of the particles is calculated, and an intensity of microscopic hot spots in the microwave field is calculated accordingly.

The advantages and positive effects of the present disclosure are shown as following:

1. The device provided by the present disclosure can not only realize the in-situ measurement of hot spots in the microwave field, but also has high measurement sensitivity and wide test temperature range. It can be applicable to the measurement of microwave-induced microscopic hot spots of various systems, to provide direct and powerful experimental verification and support for the theoretical research of micro scale microwave effect and help to reveal the internal mechanism of microwave accelerating chemical reaction, microwave strengthening material synthesis and microwave strengthening separation process.

2. The present disclosure mainly loads fluorescent temperature measuring particles on the surface of the particles to be temperature measured, uses its temperature sensitive fluorescence spectrum to monitor the local actual temperature of the particles in real time, and measures the temperature of the liquid phase body through the optical fiber thermometer. By comparing the temperature value calculated based on the fluorescence spectrum with that of the optical fiber thermometer, the temperature difference between the particles and the solvent body under microwave radiation (called "microwave-induced microscopic hot spot") can be measured. This measurement method can be applied to the microscopic hot spot measurement of various particle systems, and can provide an experimental basis for the basic research of microwave chemistry.

3. The method of the present disclosure is based on the real-time monitoring of the fluorescence spectrum, so it can realize the real-time in-situ measurement of the micro temperature. Based on the fluorescence generated by the transition of europium and terbium under ultraviolet light, it has a very fast response to the temperature, so the accurate hot spot temperature data can be obtained in-situ, which can obtain the more accurate hot spot temperature data compared with the non in-situ test.

4. By loading the microwave transparent temperature sensitive fluorescent nanomaterial on the surface of the test material, the actual temperature of the particle surface can be calculated through the fluorescence spectrum. The test material loaded with fluorescent particles to be measured is dispersed in the liquid solvent and placed in the quartz sample tank in the microwave cavity. The temperature gradient between the tested material and the liquid phase body can be measured, and the temperature of the microwave-induced hot spot in micro scale can be obtained.

5. The present disclosure uniformly disperses the particles with high dielectric loss in N, N-dimethylformamide solution, then adds biphenyl-3,3',5,5'-tetracarboxylic acid as ligand to the mixed liquid, and adds a solution containing europium ion and terbium ion. The mixed liquid is stirred and subjected to hydrothermal reaction. The characteristic peak of fluorescence spectrum of the particles obtained after the reaction is sensitive to temperature change. Therefore, the real temperature of particles in the process of microwave heating can be calculated by capturing fluorescence spectrum. The present disclosure breaks through the difficult problem of measuring micro scale temperature in microwave field and can realize the quantitative measurement of local overheating induced by microwave in micro scale.

6. Since the fluorescent nano dielectric loss is almost 0 at 2.45 GHz, the coating layer of the nano fluorescent probe introduced by the present disclosure will not affect the microscopic hot spot of the original microwave heating system. The present disclosure uses the nano fluorescent probe coated on the particle surface and its temperature sensitive fluorescence spectrum to monitor the intrinsic temperature of the particle in real time.

7. The material prepared by the present disclosure can prepare porous solid particles with different dielectric losses by adjusting the sintering temperature. Considering the temperature measurement demand of microscopic hot spots in microwave field, the present disclosure provides to coat the fluorescent organic metal frame material on the surface of high dielectric loss particles, and use its temperature sensitive fluorescence characteristics to realize the measurement of the actual temperature of particles.

DETAILED DESCRIPTION OF THE EMBODIMENTS

The embodiment of the present disclosure is described in detail below. It should be noted that the embodiment is descriptive and not restrictive, which cannot be used to limit the scope of the present disclosure.

The raw materials used in the present disclosure are conventional commercial available products, if not otherwise specified. And the methods used in the present disclosure are conventional in the art, if not otherwise specified.

Figure 1:
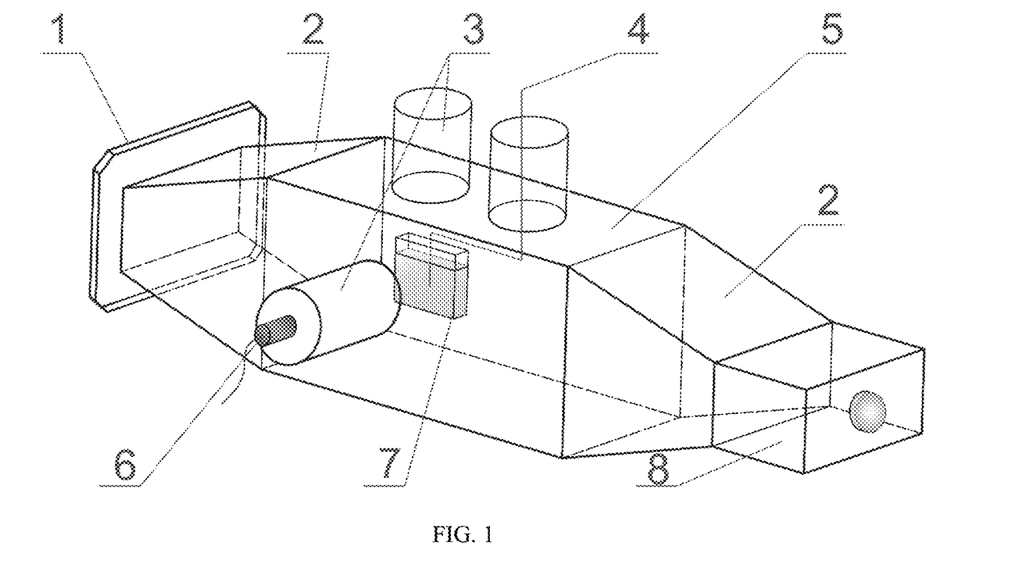
FIG. 1 is a structural connection diagram of the microwave heating measuring device in the present disclosure.

An in-situ measuring device for temperature at microscopic hot spot induced by microwave, as shown in FIG. 1, the device includes a microwave generator and a supporting rectangular waveguide 1, a transition waveguide 2, a cylindrical microwave interception structure 3, an optical fiber thermometer 4, a single-mode microwave cavity 5, an ultraviolet lamp (not shown in the drawings), a fluorescence spectrometer 6, a quartz sample tank 7 and an adjustable short-circuit piston 8. The single-mode microwave cavity is arranged along the horizontal direction, and the single-mode microwave cavity is hollow with openings at both ends, one horizontal end of the single-mode microwave cavity is closely communicated with the microwave generator and the supporting rectangular waveguide through the transition waveguide, and the other horizontal end of the single-mode microwave cavity is connected with the adjustable short-circuit piston through the transition waveguide, wherein the adjustable short-circuit piston can adjust the stagnation point position in the microwave cavity, so as to ensure that the liquid materials can be heat uniformly.

The top side and the longitudinal side of the single-mode microwave cavity are provided with openings, an opening on the top side of the single-mode microwave cavity is connected with the ultraviolet lamp, a cylindrical microwave interception structure is closely arranged between the opening on the top side of the single-mode microwave cavity and the ultraviolet lamp, and the fluorescence spectrometer is connected with an opening on the longitudinal side of the single-mode microwave cavity, and a cylindrical microwave interception structure is closely arranged between the opening on the longitudinal side of the single-mode microwave cavity and the fluorescence spectrometer, so as to avoid the leakage of microwave.

The quartz sample tank is arranged at the center of the single-mode microwave cavity, the side of the quartz sample tank is arranged facing a microwave front opening of the microwave generator, and the quartz sample tank is configured to hold liquid materials.

The optical fiber thermometer can be inserted into the quartz sample tank and can monitor the sample body temperature in the liquid sample in the quartz sample tank in real time.

When the in-situ measuring device for temperature at microscopic hot spot induced by microwave is in use, the microwave is fed into the single-mode microwave cavity 5 through the transition waveguide 2 from the microwave generator and the supporting rectangular waveguide (such as the standard BJ-26 waveguide) 1, in which the electromagnetic field distribution can be adjusted by the adjustable short-circuit piston 8. The dispersion of fluorescent nanoparticles is placed in quartz tank 7, and 265 nm ultraviolet light is emitted from the ultraviolet lamp. The fluorescence generated by the dispersion under the excitation of ultraviolet light is captured by fluorescence spectrometer 6. The optical fiber thermometer 4 is used to monitor the main body temperature of the dispersion in real time.

The device of the present disclosure can be connected to any 2.45 GHz microwave source through a waveguide to generate a single-mode electric field in the microwave cavity, which can effectively ensure that the liquid material can be heated by microwave.

An assembly method of the device of the present disclosure can be as follows:

The transition waveguide and the single-mode cavity are connected to the microwave generator in sequence through screws, and the ultraviolet lamp is fixed at the opening on the upper part of the cavity, wrapping with anti-radiation materials to avoid UV radiation damage to the experimental personnel. The probe of the optical fiber spectrometer is installed at the opening in the front of the cavity, connecting the probe to the demodulator through optical fiber, and then connecting the demodulator to the computer through USB data cable. The dispersion to be measured is poured into the quartz sample tank and is placed at the fixed position of the microwave cavity, inserting the optical fiber thermometer into the liquid sample to monitor the temperature of the sample body in real time. The transition waveguide and the adjustable short-circuit piston are connected to the single-mode cavity with screws in sequence.

In the present embodiment, the output microwave frequency of the microwave generator is 2.45 GHz, the microwave generator can adjust the output power (though a knob), and the power range is 0-600 W. The transition waveguide is designed as a trumpet shape, so as to avoid the interference of irregular metal wall reflection on the waveform of single-mode microwave cavity. The cylindrical microwave interception structure is made of stainless steel, with a diameter of 20-70 mm and a length of 100-200 mm. The adjustment range of the adjustable short-circuit piston is 0-100 mm and the adjustment accuracy is 0.1 mm. The ultraviolet lamp is a UVB ultraviolet lamp with a rated power of 0-50 W and a light source wavelength of 265 nm. The fluorescence spectrometer is an optical fiber spectrometer (such as commercially available OCEAN optical fiber spectrometer), and the test wavelength range is 300-1000 nm. The quartz sample tank is a square quartz sample tank with a size of (40-100) mm*(30-80) mm*(5-20) mm.

The device described above are applied in microscopic hot spot measurement. The above device are applied in exploring the effects of different material properties and experimental conditions on the intensity of microwave-induced microscopic hot spots.

The method for in-situ measurement of temperature at microwave-induced microscopic hot spots using the device described above, the steps are as follows:

Nano scale fluorescent thermometric particles are loaded on the surface of the solid particles to be measured. The fluorescence changes of particles at different temperature points are recorded under conventional heating, and the quantitative relationship between fluorescence characteristics and temperature are obtained by fitting. The solid particles are dispersed in liquid solvent, and the fluorescence spectrum under microwave heating is measured in real time by the optical fiber spectrometer. At the same time, the optical fiber thermometer is used to monitor the main body temperature of the solution in real time. By using the quantitative relationship between fluorescence characteristics and temperature, the actual temperature of solid particles under microwave heating can be calculated. Comparing the particle temperature with the solvent body temperature, the temperature gradient between microwave-induced solid particles and solution body under specific experimental conditions can be calculated to characterize the intensity of microwave-induced microscopic local hot spots. The fluorescence characteristic information of the fluorescence temperature measuring particles changes monotonously and obviously with the temperature, so as to accurately obtain the temperature of the particle by observing the fluorescence spectrum.

Specifically, the specific steps are as follows:

(1) Loading Fluorescent Temperature Measuring Particles on the Surface of Solid Particles The solid particles to be measured are prepared by hydrothermal synthesis. Therefore, dispersing the solid particles to be temperature measured into the liquid solvent in the reactor, adding the fluorescent temperature measuring particles into the liquid solvent to perform a reaction in the hydrothermal synthesis reactor for a period of time until the loading is completed. After the reaction, the solution after the reaction is centrifuged to obtain solid particles loaded with the fluorescent temperature measuring particles, which are also called particles to be temperature measured (See embodiment 4). Dispersing the obtained particles into the specified solvent in a beaker, and then placing the beaker in an electric heating device to raise the temperature of the solvent. During this period, applying a fluorescence measurement probe to measure changes of fluorescence spectrum in real time under ultraviolet light. Establishing a quantitative relationship between fluorescence information and temperature according to characteristic peaks of fluorescence spectrum at different temperature points;

(2) Measuring the Temperature of the Solid Particles in Microwave Field

Firstly, absolute ethanol is poured into the quartz tank and placed in the microwave cavity, the measurement device is installed, and the ultraviolet lamp is turned on until the light intensity is stable. The device is disassembled after deducting the background spectrum, and the absolute ethanol is taken out, drying the quartz tank. Dispersing the particles loaded with the fluorescent temperature measuring particles in step (1) in the solvent to be measured and treating the solvent to be measured under ultrasonic conditions until the particles uniformly dispersed to obtain a dispersion. Transferring the dispersion to the quartz sample tank and fixing the measurement device. Turning on the ultraviolet lamp until the light intensity is stable. Turning on the microwave generator, adjusting the power to a specified value, and adjusting the adjustable short-circuit piston to ensure that the system can be heated effectively. Checking whether there is microwave leakage through microwave leak detector to ensure the safety of experimental personnel. Applying an optical fiber thermometer to monitor the temperature of liquid phase body in real time. Applying the measuring probe of the fluorescence spectrometer to record the fluorescence spectrum emitted by the particles in real time. Comparing the temperature calculated based on fluorescence information with the temperature of the liquid phase body, the temperature gradient between particles and the liquid phase body in microwave field can be calculated, that is, the microwave-induced microscopic hot spots.

The method described above can also be applied in microscopic hot spot measurement. It can also be used to explore the effects of different material properties and experimental conditions on the intensity of microwave-induced microscopic hot spots.

Specifically, the relevant preparation and detection embodiments are as follows:

Embodiment 1-3 are the method for in-situ measurement of temperature at microwave-induced microscopic hot spots.

Embodiment 1

A method for preparing fluorescent-loaded particles to be temperature measured, wherein the steps are as following:

(1) Preparing Solid Particles to be Measured

Accurately weighing 2 g of ferrous-based metal organic frame material (Fe-MOF), evenly pouring it into a square corundum crucible, put it into a tubular furnace, and then raising the temperature to 300° C. to bake it in air environment for 30 minutes; then filling the tubular furnace with nitrogen, raising the temperature to 700° C. to bake it in nitrogen environment for 5 minutes. Saving the obtained black particles for later use and record them as C-700.

(2) Loading Fluorescent Nanoparticles into Nano Solid Particles Through Hydrothermal Method a) Weighing 200 mg C-700 and fully dispersing it in DMF under ultrasonic stirring until there is no precipitation;

b) Accurately weighing 520 mg reactant precursor of the fluorescent temperature measuring particles (the molar ratio of europium ion ($Eu^{+3}$):terbium ion ($Tb^{+3}$):biphenyl-3,3',5,5'-tetracarboxylic acid is 2:8:5), adding the reactant precursor into 50 ml DMF, then heating and stirring until it is completely dissolved;
c) Pouring the solution prepared in steps a) and b) into the dispersion described in step a), transferring the obtained solution to an oil bath pot to react at 100° C. for 48 hours.
d) Transferring the solution after the reaction to the centrifuge tube, washing it with absolute ethanol for three times at a speed of 7000 r/min for 20 minutes, and drying the obtained solid particles in an oven at 80° C. for 4 hours to stored for later use, which is recorded as LC-700.

(3) Establishing the Quantitative Relationship Between Fluorescence Information and Temperature
a) Dispersing the solid particles obtained in step (2) into the solvent of the beaker, and performing ultrasonic treatment for 20 minutes until the particles are evenly dispersed;
b) Placing the beaker on the electric heating plate, and then turning on the heating to raise the temperature;
c) Turning on the ultraviolet lamp, and recording the spectrum of the solution with OCEAN optical fiber spectrometer;
d) Correlating the intensity ratios of the peaks at the 543 nm and 641 nm with temperature, so as to obtained the quantitative correlation between fluorescence information and temperature.

(4) Measuring the Temperature of Microscopic Hot Spots in Microwave Field
a) Taking 100 mg of the above obtained LC-700 particles and dispersing them into 50 ml of n-pentanol solution, performing ultrasound for 20 minutes to make the particles disperse evenly;
b) Placing the dispersion in a square quartz container, then placing them in a single-mode microwave cavity, and then turning on the ultraviolet lamp until the light intensity is stable;
c) After the microwave device is assembled, turning on the microwave generator, using the sensing probe of the optical fiber spectrometer to capture the fluorescence intensity of the dispersion from the window, and using the optical fiber thermometer to measure the temperature of the main body of the liquid phase.

Figure 2:
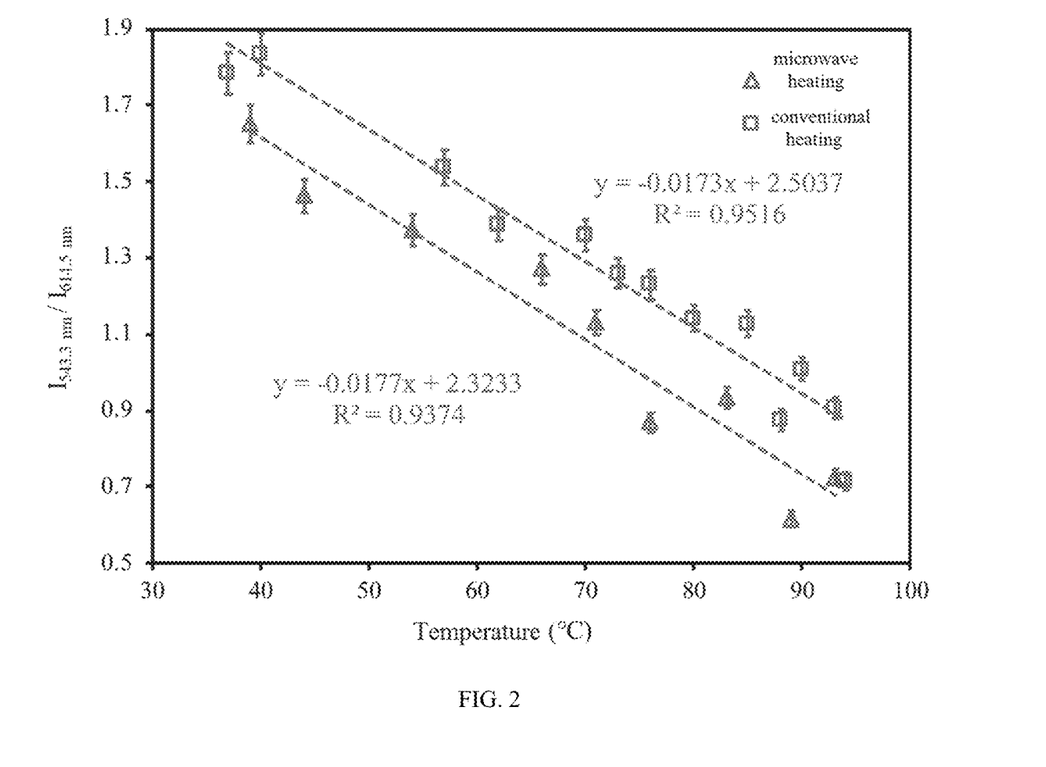
FIG. 2 is a comparison diagram of particle temperature and solvent temperature under microwave heating and conventional heating in embodiment 1 of the present disclosure.

As shown in FIG. 2, FIG. 2 shows the correlation between fluorescence intensity ratio and temperature under conventional heating and 100 W microwave radiation. Through comparison, it can be seen that the temperature gradient of microwave-induced hot spot of LC-700 particles in n-pentanol is 13.8° C.

Embodiment 2

A method for preparing fluorescent-loaded particles to be temperature measured, wherein the steps are as following:
(1) The preparation steps of the solid to be measured are the same as those in embodiment 1, and the result is C-700.
(2) Loading fluorescent nanoparticles with nano solid particles through the hydrothermal method, the same as embodiment 1, and the result is LC-700.
(3) Establishing the quantitative relationship between fluorescence information and temperature is the same as that in embodiment 1.
(4) Measuring the temperature of the microscopic hot spots in microwave field.

a) Taking 100 mg of the above obtained LC-700 particles to disperse them into 50 ml of n-propanol solution, performing ultrasound for 20 minutes to make the particles disperse evenly;
b) Placing the dispersion in a square quartz container, and placing them in a single-mode microwave cavity, and then turning on the ultraviolet lamp until the light intensity is stable;
c) After the microwave device is assembled, turning on the microwave generator, using the sensing probe of the optical fiber spectrometer to capture the fluorescence intensity of the dispersion from the window, and using the optical fiber thermometer to measure the temperature of the main body of the liquid phase.

Figure 3A:
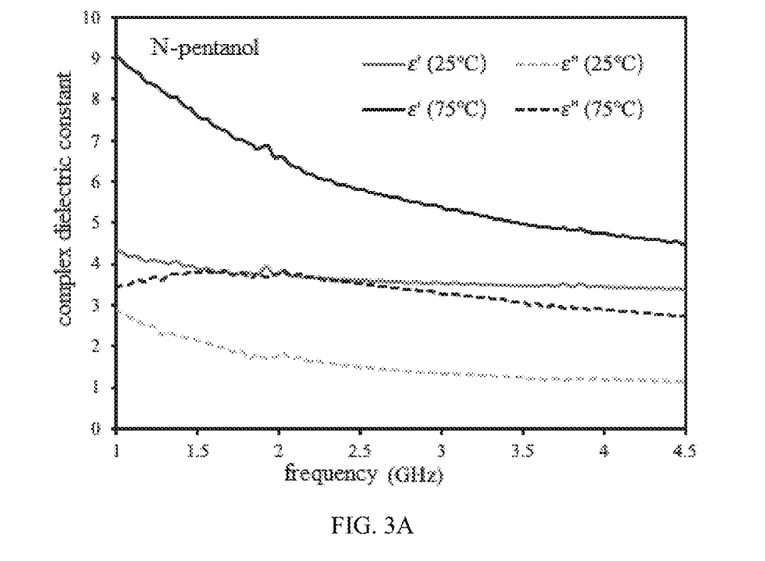
FIG. 3A is a diagram of the dielectric constant and dielectric loss of the solvent in embodiment 2 of the present disclosure.
Figure 3B:
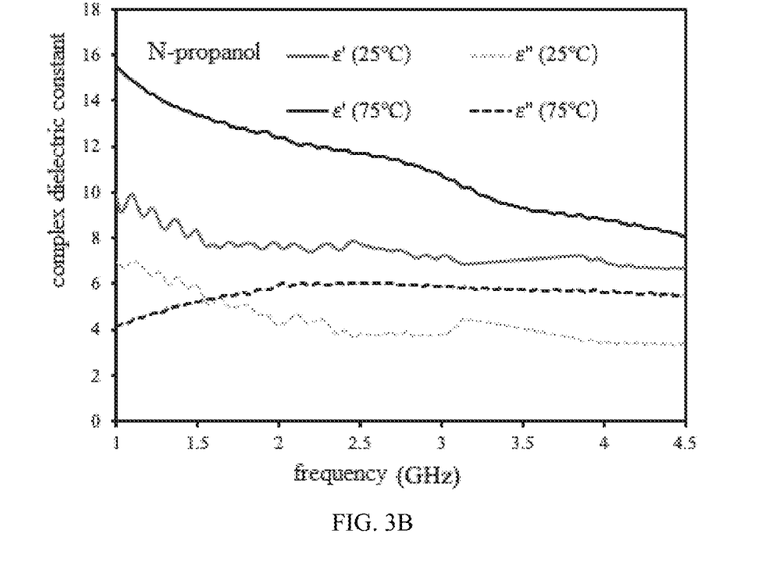
FIG. 3B is another diagram of the dielectric constant and dielectric loss of the solvent in embodiment 2 of the present disclosure.
Figure 4:
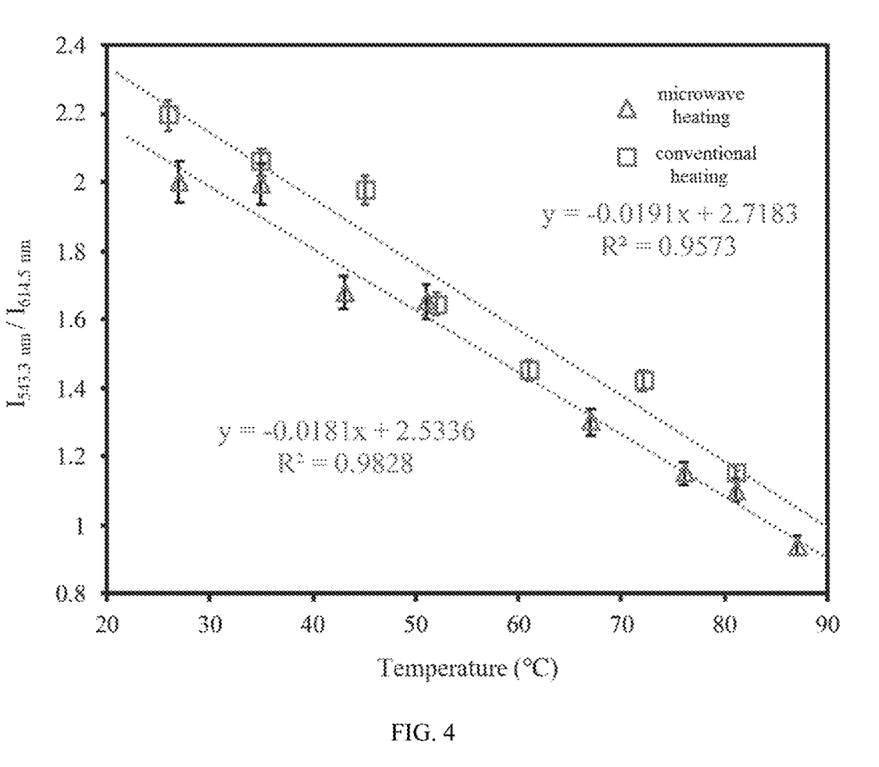
FIG. 4 is a comparison diagram of particle temperature and solvent temperature under microwave heating and conventional heating in embodiment 2 of the present disclosure.

The results are shown in FIGS. 3A-3B and FIG. 4. FIG. 3A shows the dielectric loss of n-pentanol, and FIG. 3B shows the dielectric loss of n-propanol. The thermal conductivity of n-propanol is higher than that of n-pentanol. The data of dielectric properties are measured by network analyzer and coaxial probe method. FIG. 4 shows that the temperature gradient of microwave-induced hot spot of LC-700 particles in n-propanol is 5.0° C. It can be seen that the increase of dielectric loss of solvent reduces the gap between particles and solvent in microwave absorption capacity, thus weakening the microscopic hot spot phenomenon in microwave field.

Embodiment 3

A method for preparing fluorescent-loaded particles to be temperature measured, wherein the steps are as following:
(1) Preparing ferrous-based metal organic frame material particles
Evenly pouring Fe-MOF particles into a square corundum crucible, then putting the square corundum crucible into the tubular furnace, and then raising the temperature to 300° C. to bake it in air environment for 30 minutes. And then filling the tubular furnace with nitrogen, raising the temperature to 700° C. to bake it in nitrogen environment for 5 minutes. Saving the obtained black particles for later use and record them as C-700.
(2) Loading fluorescent nanoparticles (the molar ratio of europium ion ($Eu^{+3}$):terbium ion ($Tb^{+3}$):biphenyl-3,3',5,5'-tetracarboxylic acid is 2:8:5) with the solid particle C-800 through the hydrothermal method, which is the same as embodiment 1, and the result is LC-800.
(3) Establishing the quantitative relationship between fluorescence information and temperature is the same as that in embodiment 1.
(4) The steps of measuring the temperature of microscopic hot spots in the microwave field are the same as those in embodiment 1.

The fluorescence spectrum at different temperature points obtained in embodiments 1-3 are processed, fluorescence intensities of two characteristic peaks at 543.3 nm and 614.5 nm are taken, and the ratio of the two fluorescence intensities $I_{543.3\ nm}/I_{614.5\ nm}$ are fitted with the temperature, to obtain the correlation between $I_{543.3\ nm}/I_{614.5\ nm}$ and temperature under conventional heating and microwave radiation, and the intensity of microwave-induced microscopic hot spots can be calculated based on the temperature difference between them.

Figure 5:
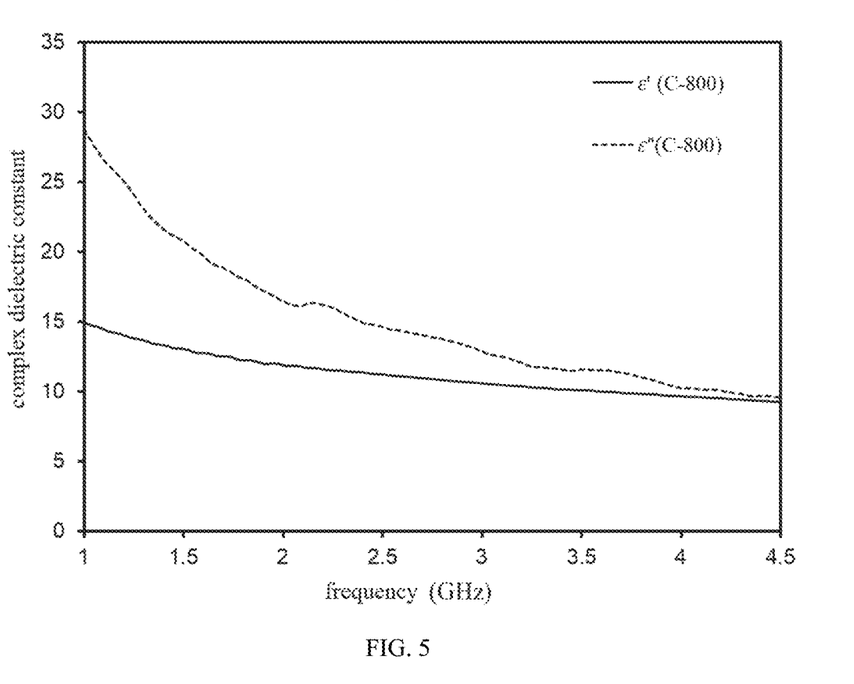
FIG. 5 is a diagram of the dielectric constant and dielectric loss of the solid particles prepared in embodiment 3 of the present disclosure.
Figure 6:
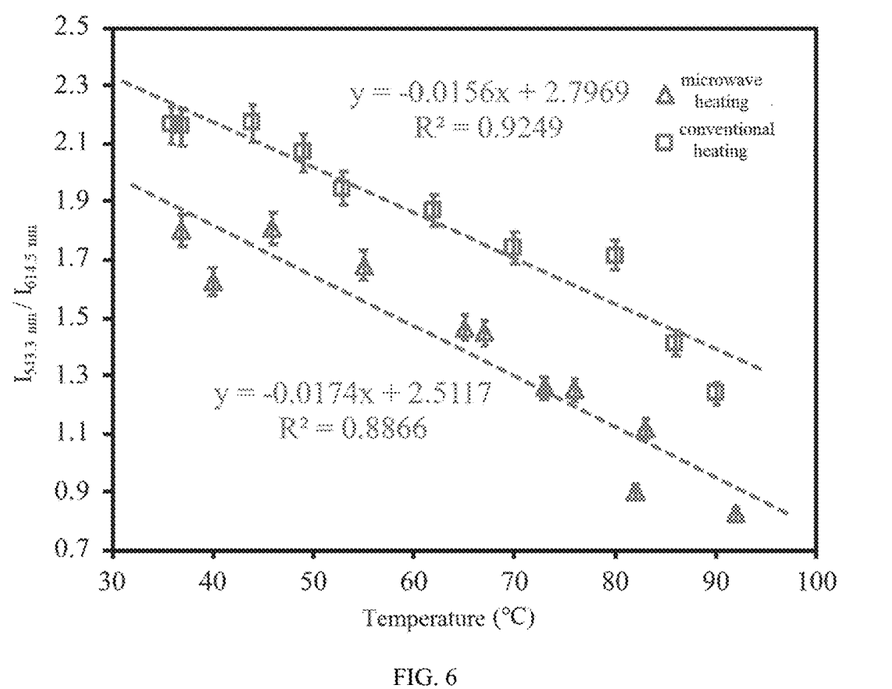
FIG. 6 is a comparison diagram of particle temperature and solvent temperature under microwave heating and conventional heating in embodiment 3 of the present disclosure.

The results are shown in FIG. 5 and FIG. 6, FIG. 5 shows the dielectric constant and the dielectric loss of the prepared LC-800. As the carbonization degree of the material further increases with the increase of temperature, the dielectric loss is increased. FIG. 6 shows that the temperature gradient of LC-800 in n-pentanol can reach 24° C.

The above embodiments show that the present disclosure has good applicability for the dispersion systems of different particles in various solvents, and can be used to explore the effects of different material properties and experimental conditions on the intensity of microwave-induced microscopic hot spots.

In order to better implement the above method, the present disclosure provides a embodiment 4 to provide a solid material loaded with fluorescent temperature measuring particles. This material can also be called a material for measuring microscopic hot spots in microwave field.

Embodiment 4

A method for preparing solid particles and loading fluorescent temperature measuring particles on the surface of solid particles, which includes the following steps:

(1) Preparing Ferrous-Based Metal Organic Frame Material Particles
  a) Accurately weighing 2.70 g of ferric chloride pentahydrate and 1.66 g of terephthalic acid, dissolving them in 60 ml of N, N-dimethylformamide (DMF) under ultrasonic stirring until the solid is completely dissolved;
  b) Transferring the reaction solution mentioned in the first step to the oil bath pot, stabilizing the reaction temperature at 100° C., and stirring at 300 r/min to react for 4 hours;
  c) Transferring the reaction solution in the second step to the centrifugal tube, washing it with absolute ethanol for three times, wherein the rotating speed is set at 8000 r/min for 15 minutes each time;
  d) Drying the orange solid particles obtained above in an oven at 80° C. for 4 hours.
  e) Pouring the orange solid particles evenly into the square corundum crucible, and then placing the square corundum crucible into the tubular furnace, raising the temperature to 300° C. to bake them in the air environment for 30 minutes. Then filling the tubular furnace with nitrogen, raising the temperature to 700° C. to bake them in nitrogen environment for 5 minutes. Saving the obtained black solid particles for later use.

(2) Loading Nano Solid Particles with Fluorescent Temperature Measuring Particles Through Hydrothermal Method
  a) Weighing 200 mg of black particles prepared in step (1) and fully dispersing them in DMF solution under ultrasonic stirring until there is no precipitation;
  b) Accurately weighing 165 mg of biphenyl-3,3',5,5'-tetracarboxylic acid into 50 ml DMF, heating and stirring until completely dissolved;
  c) Accurately weighing 360 mg terbium nitrate hexahydrate and 90 mg europium nitrate hexahydrate, adding 10 ml DMF and stirring until completely dissolved;
  d) Pouring the solution prepared in steps b) and c) into the dispersion described in step a), transferring the obtained solution to an oil bath pot to react at 100° C. for 48 hours.
  e) Transferring the reaction solution to the centrifuge tube, and washing it with absolute ethanol for three times at a speed of 7000 r/min for 20 minutes, and then drying the obtained solid particles in an oven at 80° C. for 4 hours (this material can also be obtained without drying, and the purpose of drying is to facilitate packaging and storage).

Figure 7:
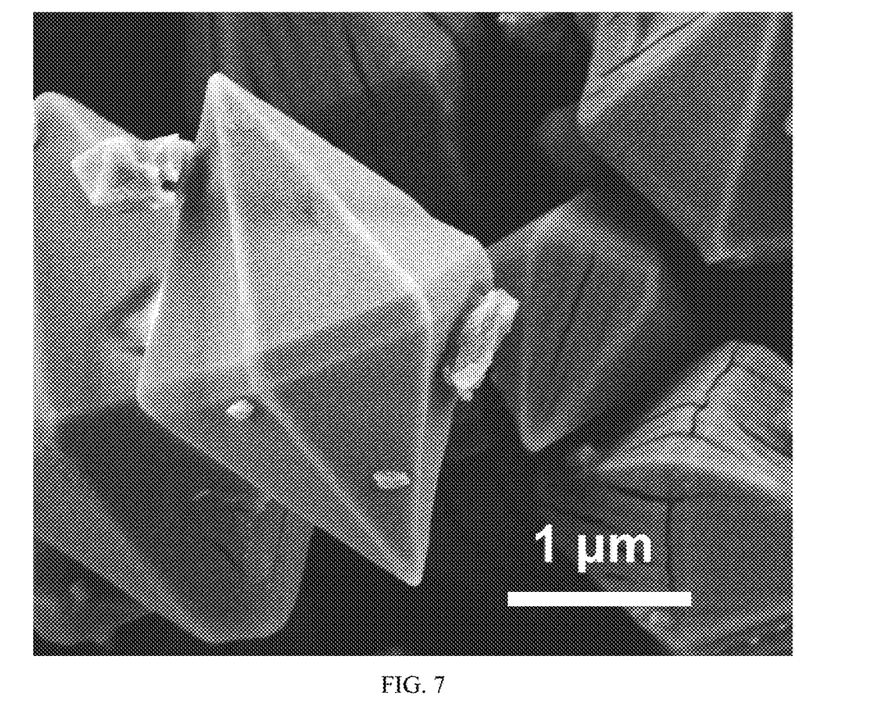
FIG. 7 is a scanning electron microscope image of the iron-based metal organic frame material prepared in the embodiment of the present disclosure.

After testing, it can be seen from FIG. 7 that the orange solid particles obtained in step (1) have a hexagonal biconical regular structure, which can provide a template for the subsequent preparation of porous carbon.

Figure 8:
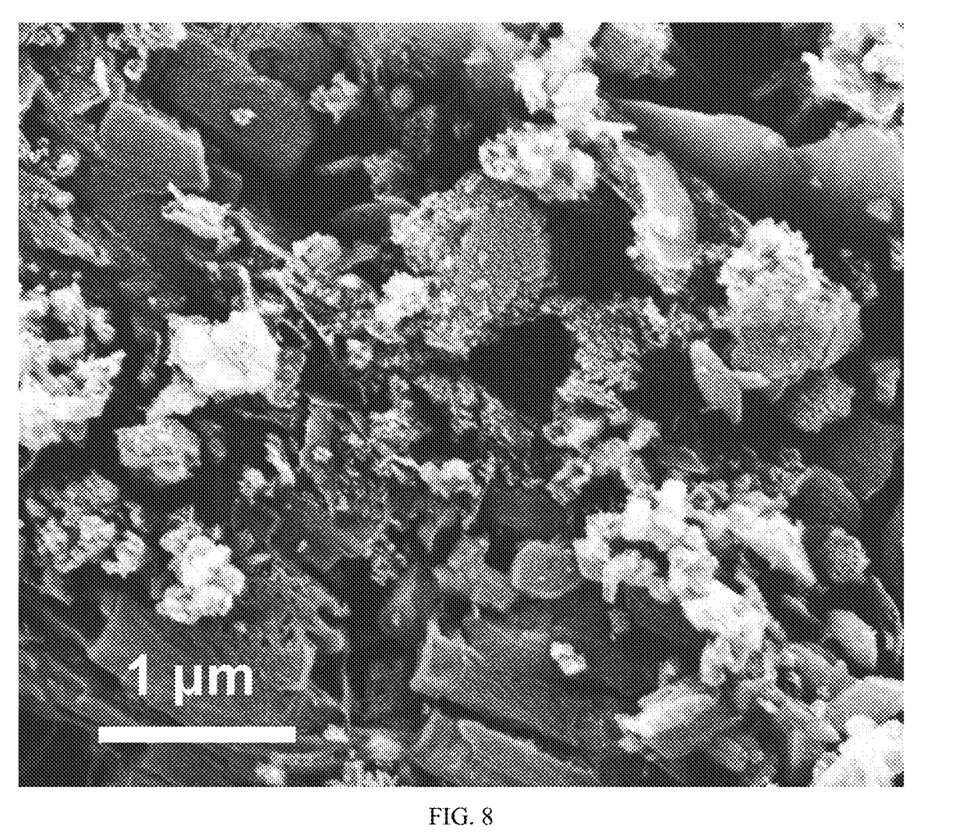
FIG. 8 is a scanning electron microscope image of the porous solid particles prepared in the embodiment of the present disclosure.

FIG. 8 shows the scanning electron microscope of the black particles obtained in step (1), whose original smooth structure is destroyed and transformed into porous carbon structure.

Figure 9:
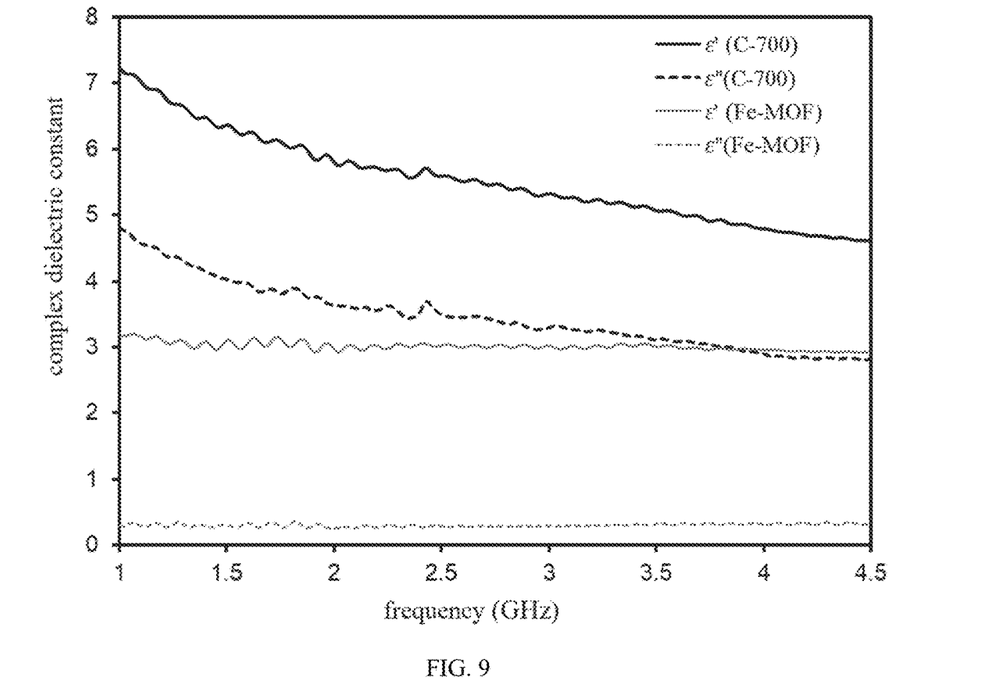
FIG. 9 shows the dielectric constant and dielectric loss of the porous solid particles prepared in the embodiment of the present disclosure.

FIG. 9 shows the dielectric constant and the dielectric loss of orange and black solid particles. High temperature carbonizes the organic ligands and greatly improves the dielectric loss of the material. Therefore, the graphitization degree of solid particles can be controlled by adjusting the pyrolysis temperature, so as to adjust the dielectric loss of solid particles.

Figure 10:
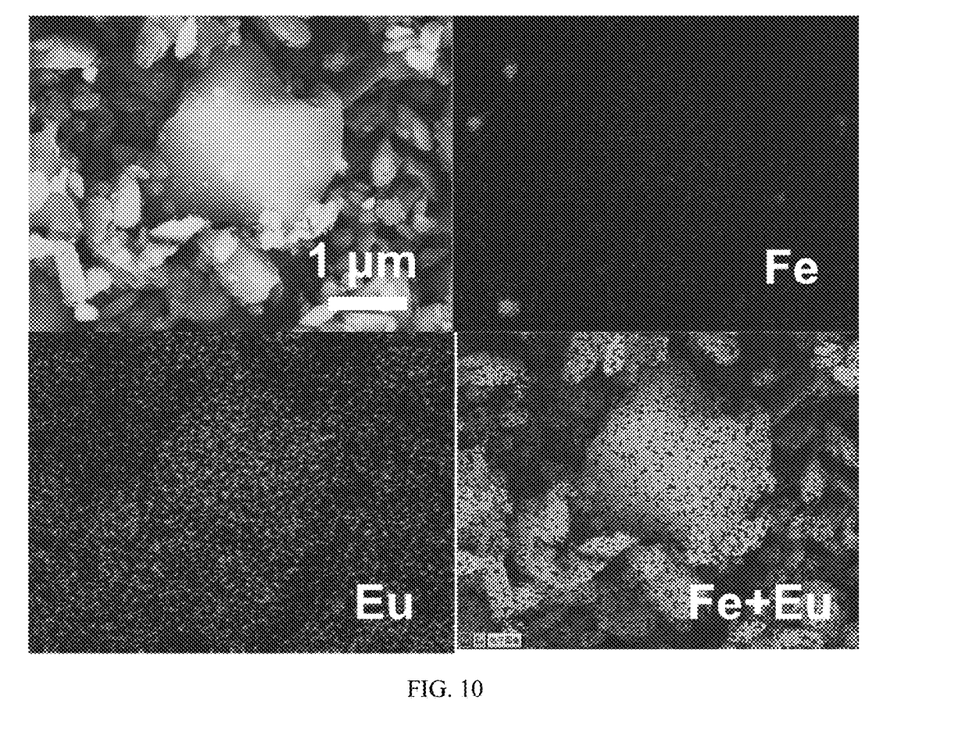
FIG. 10 is a scanning electron microscope image of particles loaded with fluorescent temperature measuring particles in the embodiment of the present disclosure.

FIG. 10 shows the coating structure of fluorescent temperature measuring particles on solid particles. The fluorescent temperature measuring particles can be successfully loaded outside the solid particles by hydrothermal method.

Figure 11:
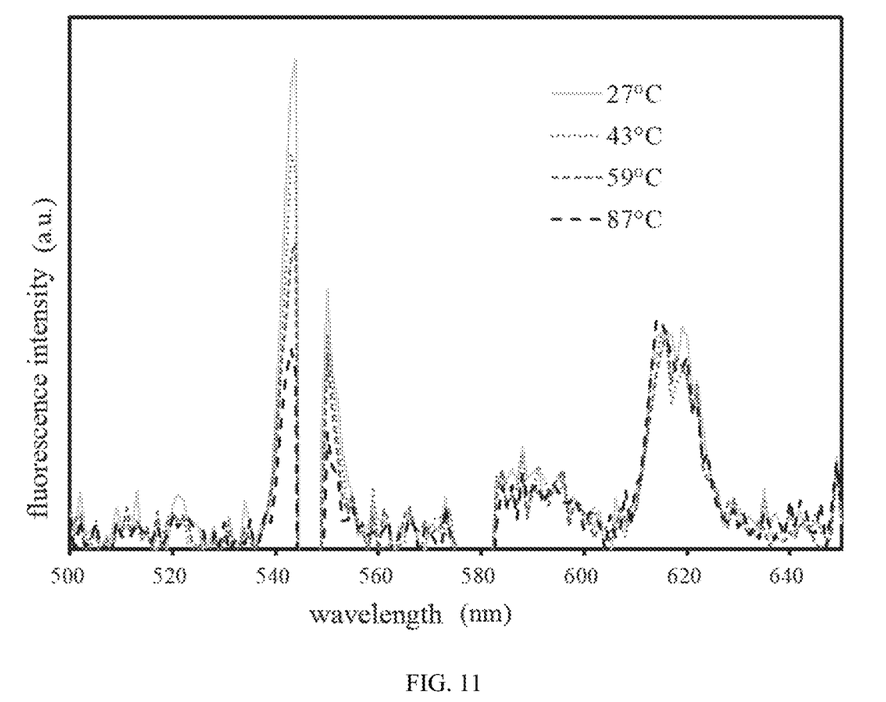
FIG. 11 is a fluorescence spectrum of each temperature point in the embodiment of the present disclosure.

It can be seen from FIG. 11 that the fluorescent temperature measuring particles show different fluorescence spectral characteristics at each temperature value. The fluorescence peak at 543.3 nm decreases significantly with the increase of temperature, while the fluorescence peak at 614.5 nm remains basically unchanged at each temperature point. Therefore, the ratio of the fluorescence intensity of the two peaks is correlated with the temperature.

Figure 12:
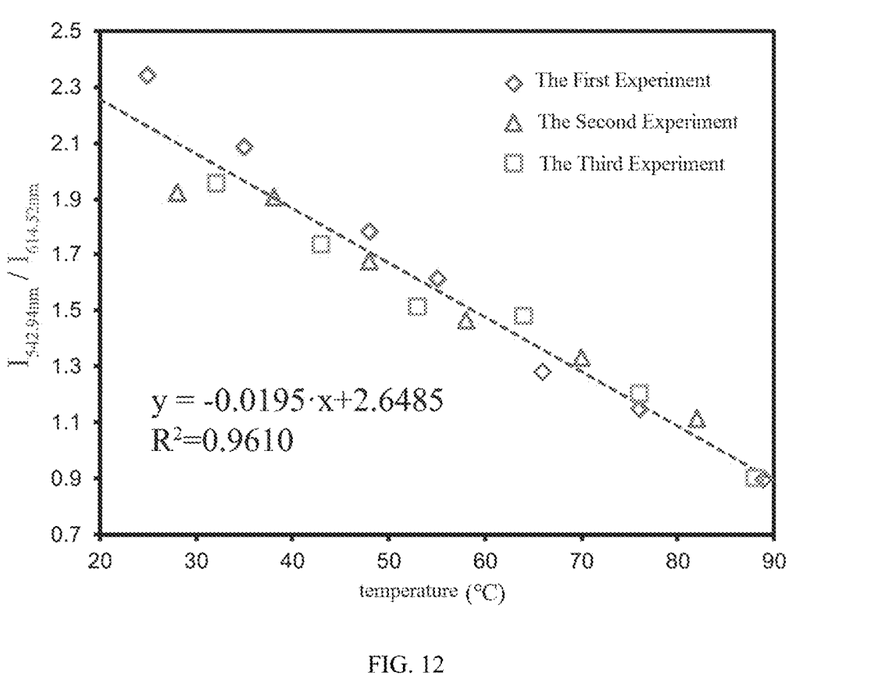
FIG. 12 shows the relationship between the characteristic peak ratio of fluorescence spectrum and temperature in the embodiment of the present disclosure.

FIG. 12 shows the correlation between the fluorescence intensity ratio $I_{543.3\ nm}/I_{614.5\ nm}$ and temperature. The quantitative relationship has good experimental repeatability and can be used as the main index of microscopic hot spot temperature measurement in microwave field. By capturing the fluorescence spectrum of particles, the actual temperature of specified particle can be measured in real time, and the temperature gradient at microscopic hot spot in microwave field can be calculated.

Wherein, the above method or device, such as the scanning electron microscope (SEM) used in the detection of FIG. 7 and FIG. 8, the network analyzer used in the detection of FIG. 9, the EDS test of SEM used in the detection of FIG. 10, and the transient fluorescence spectrum or OCEAN fluorescence test system which can be used in the detection of FIG. 11, are well-known in the art, so it is not described in detail for brevity.

Although the embodiments of the present disclosure are disclosed for illustrative purposes, those skilled in the art can understand that various substitutions, changes and modifications are possible without departing from the spirit and scope of the present disclosure and the appended claims. Therefore, the scope of the present disclosure is not limited to the contents disclosed in the embodiments.

What is claimed is:

1. An in-situ measuring device for temperature at microscopic hot spot induced by microwave, comprising a microwave generator and a supporting rectangular waveguide, a transition waveguide, a cylindrical microwave interception structure, an optical fiber thermometer, a single-mode microwave cavity, an ultraviolet lamp, a fluorescence spectrometer, a quartz sample tank and an adjustable short-circuit piston; the single-mode microwave cavity is arranged along a horizontal direction, and the single-mode microwave cavity is hollow with openings at both ends, one horizontal end of the single-mode microwave cavity is closely communicated with the microwave generator and the supporting rectangular waveguide through the transition waveguide, and the other horizontal end of the single-mode microwave cavity is connected with the adjustable short-circuit piston through the transition waveguide, wherein the adjustable short-circuit piston is capable of adjusting the stagnation point position in the microwave cavity;

a top side and a longitudinal side of the single-mode microwave cavity are provided with openings, an opening on the top side of the single-mode microwave cavity is connected with the ultraviolet lamp, the cylindrical microwave interception structure is closely arranged between the opening on the top side of the single-mode microwave cavity and the ultraviolet lamp, and the fluorescence spectrometer is connected with an opening on the longitudinal side of the single-mode microwave cavity, and the cylindrical microwave interception structure is closely arranged between the opening on the longitudinal side of the single-mode microwave cavity and the fluorescence spectrometer;

the quartz sample tank is arranged at a center of the single-mode microwave cavity, a side of the quartz sample tank is arranged facing a microwave front opening of the microwave generator, and the quartz sample tank is configured to hold liquid materials; and the optical fiber thermometer is configured to be inserted into the quartz sample tank and monitor a sample body temperature in a liquid sample in the quartz sample tank in real time.

2. The in-situ measuring device for temperature at microscopic hot spot induced by microwave according to claim 1, wherein an output microwave frequency of the microwave generator is 2.45 GHZ, the microwave generator is capable of adjusting an output power, and a power range is 0-600 W;

or the transition waveguide is a trumpet shape;

or the cylindrical microwave interception structure is made of stainless steel, with a diameter of 20-70 mm and a length of 100-200 mm.

3. The in-situ measuring device for temperature at microscopic hot spot induced by microwave according to claim 1, wherein an adjustment range of the adjustable short-circuit piston is 0-100 mm and an adjustment accuracy is 0.1 mm; or, the ultraviolet lamp is a UVB ultraviolet lamp with a rated power of 0-50 W and a light source wavelength of 265 nm.

4. The in-situ measuring device for temperature at microscopic hot spot induced by microwave according to claim 1, wherein the fluorescence spectrometer is an optical fiber spectrometer, and a test wavelength range is 300-1000 nm;

or, the quartz sample tank is a square quartz sample tank with a size of (40-100) mm*(30-80) mm*(5-20) mm.

5. A method for in-situ measurement of temperature at microwave-induced microscopic hot spots using the device according to claim 1, comprising the steps as follows:

(1) loading fluorescent temperature measuring particles on a surface of solid particles dispersing the solid particles to be temperature measured into a liquid solvent, adding a precursor of fluorescent temperature measuring particles into the liquid solvent to perform a reaction in the hydrothermal synthesis reactor until the loading is completed; after the reaction, the solution after the reaction is centrifuged to obtain solid particles loaded with the fluorescent temperature measuring particles, which are called particles to be temperature measured; dispersing the particles to be temperature measured into a solvent, and then placing the solvent in an electric heating device to raise a temperature of the solvent; during this period, applying a fluorescence measurement probe to measure changes of fluorescence spectrum in real time under ultraviolet light; establishing a quantitative relationship between fluorescence information and temperature according to characteristic peaks of fluorescence spectrum at different temperature points;

(2) measuring the temperature of the solid particles in microwave field dispersing the particles to be temperature measured obtained in step (1) in a solvent to be measured and treating the solvent to be measured under ultrasonic conditions until the particles to be temperature measured uniformly dispersed to obtain a dispersion; transferring the dispersion to the quartz sample tank; turning on the ultraviolet lamp until a light intensity is stable; turning on the microwave generator, adjusting a power to a specified value, and adjusting the adjustable short-circuit piston to ensure that a system is heated effectively; applying an optical fiber thermometer to monitor a temperature of liquid phase body in real time; applying a measuring probe of the fluorescence spectrometer to record the fluorescence spectrum emitted by the particles to be temperature measured in real time; comparing the temperature calculated based on fluorescence information with the temperature of the liquid phase body, a temperature gradient between particles and the liquid phase body in microwave field is calculated, that is, microwave-induced microscopic hot spots.

6. The method for in-situ measurement according to claim 5, wherein the fluorescence temperature measuring particles are europium ion, terbium ion and biphenyl-3,3',5,5'-tetracarboxylic acid, and a molar ratio of europium ion, terbium ion and biphenyl-3,3',5,5'-tetracarboxylic acid is 3-5:0.5-2:3-8.

* * * * *